(12) United States Patent
Takasaka (10) Patent No.: US 6,405,956 B1
(45) Date of Patent: Jun. 18, 2002

(54) TAPE DECK HAVING A BRAKING MEMBER FOR PRODUCING DIFFERENT BRAKING STATES ON A REEL HOLDER

(75) Inventor: Daisuke Takasaka, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 09/615,989

(22) Filed: Jul. 14, 2000

(30) Foreign Application Priority Data

Aug. 4, 1999 (JP) ............................................ 11-005869

(51) Int. Cl.$^7$ ............................................... B65H 59/38
(52) U.S. Cl. .................................. 242/334.6; 242/421.8
(58) Field of Search .......................... 242/334.6, 421.8, 242/421.9, 422.8; 360/71, 85, 93, 95

(56) References Cited

U.S. PATENT DOCUMENTS

| 3,539,129 A | * | 11/1970 | Schmidt et al. | |
| 5,180,117 A | * | 1/1993 | Katohno et al. | 360/95 X |
| 5,333,807 A | * | 8/1994 | Maehara et al. | 242/334.6 |
| 5,430,585 A | * | 7/1995 | Takada et al. | 360/85 |
| 5,609,310 A | * | 3/1997 | Kobayashi | 242/334.6 |
| 5,697,568 A | * | 12/1997 | Ishii | 242/334.6 |
| 5,868,332 A | * | 2/1999 | Fukuzawa | 242/334.6 X |
| 5,934,593 A | * | 8/1999 | Okuie | 242/334.6 X |

FOREIGN PATENT DOCUMENTS

| JP | 59-86052 | 6/1984 |
| JP | 03100955 A | 4/1991 |
| JP | U 3055109 | 1/1999 |

* cited by examiner

Primary Examiner—William A. Rivera
(74) Attorney, Agent, or Firm—Lackenbach Siegel, LLP (57) ABSTRACT

A tape deck capable of simplifying a structure for obtaining a braking state is obtained. This tape deck comprises a brake member wound on a reel holder for holding the reel holder in a braking state, a swing member having a tension supply part for supplying a loaded tape with tension and a band pressing part for pressing the brake member thereby bringing the brake member into contact with the reel holder and a movable member coupled with the swing member through an elastic member. The swing member having the tension supply part is provided with the band pressing part for obtaining a second braking state (soft braking state), so that no additional component may be separately formed for obtaining the second braking state (soft braking state). Consequently, the number of components as well as the manufacturing cost are reduced.

12 Claims, 10 Drawing Sheets

TAPE DECK HAVING A BRAKING MEMBER FOR PRODUCING DIFFERENT BRAKING STATES ON A REEL HOLDER

BACKGROUND OF THE INVENTION

1. Field of the Invention

The present invention relates to a tape deck, and more particularly, it relates to a tape deck applied to a video cassette recorder or the like.

2. Description of the Prior Art

In general, a tape deck for a video cassette recorder or the like is known as an apparatus for magnetically recording and/or reproducing information in and/or from a tape. For example, Japanese Utility Model Registration No. 3055109 discloses such a tape deck.

Figure 8:
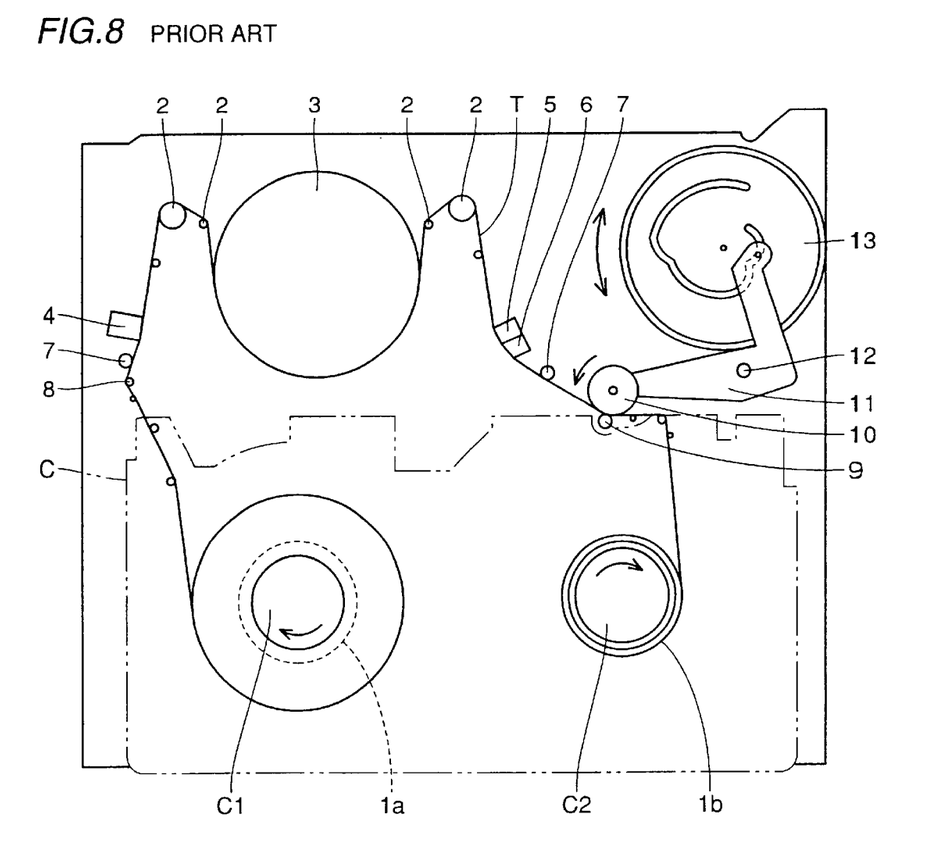
FIG. 8 schematically illustrates the structure of a conventional tape deck.

FIG. 8 schematically illustrates the structure of the conventional tape deck disclosed in the aforementioned gazette. The structure of the conventional tape deck is schematically described with reference to FIG. 8.

The conventional tape deck comprises reel holders 1a and 1b, loading posts 2, a head cylinder 3, a full-width erase head 4, a voice erase head 5, a voice control head 6, tape guide posts 7, a tension post 8, a capstan 9, a pinch roller 10, an arm 11, a support shaft 12 for the arm 11 and a rotating cam 13.

A supply reel C1 and a take-up reel C2 of a tape cassette C are set on the reel holders 1a and 1b respectively. The loading posts 2 are movably set for drawing out a tape T from the tape cassette C and winding the same on the head cylinder 3. The tape guide posts 7 are fixedly set. The tension post 8 is movably set for supplying tension to the loaded tape T.

Figure 9:
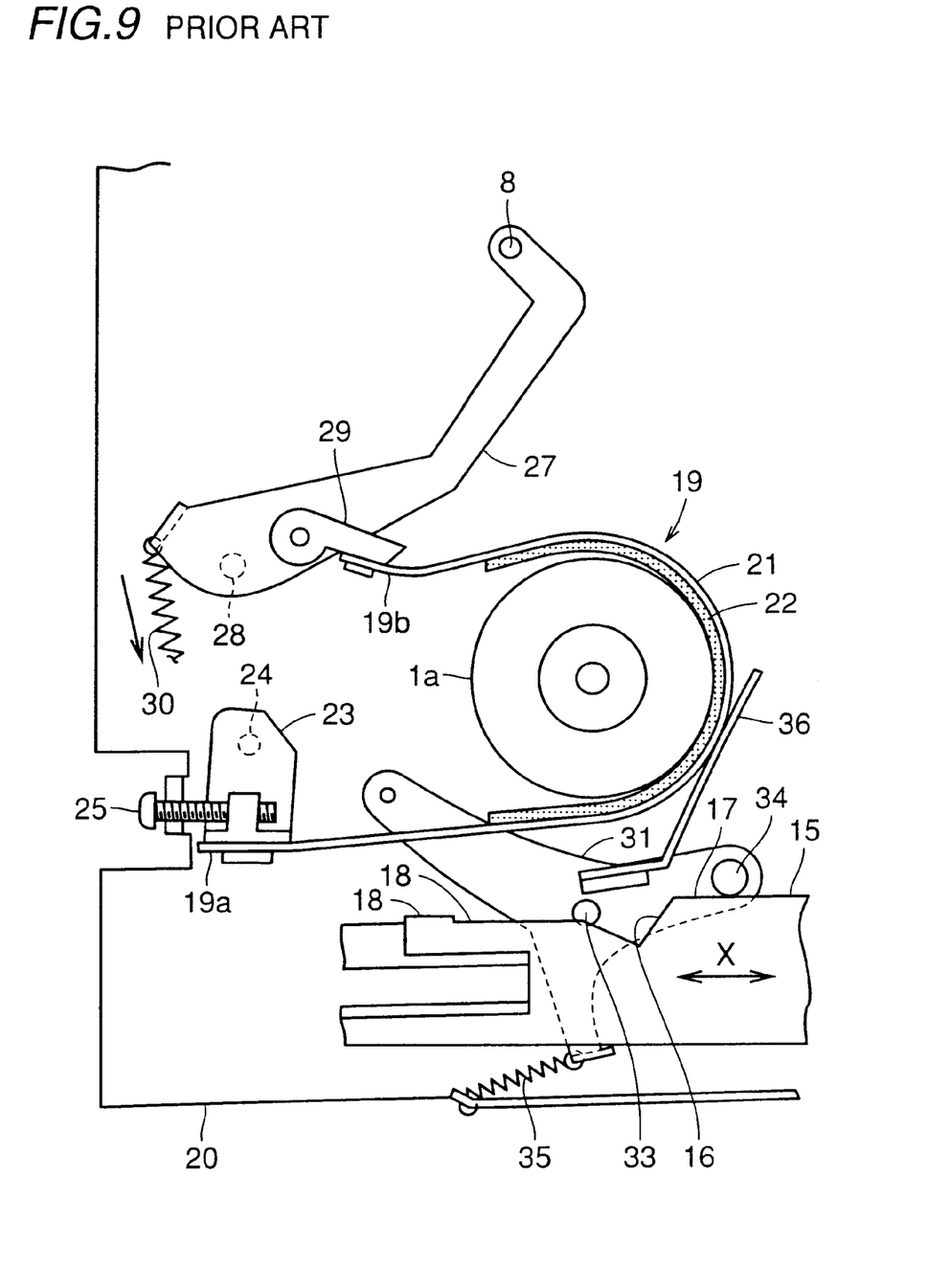
FIG. 9 is a plain view showing principal parts of the conventional tape deck shown in FIG. 8 in a first stage of a tape loading mode.
Figure 10:
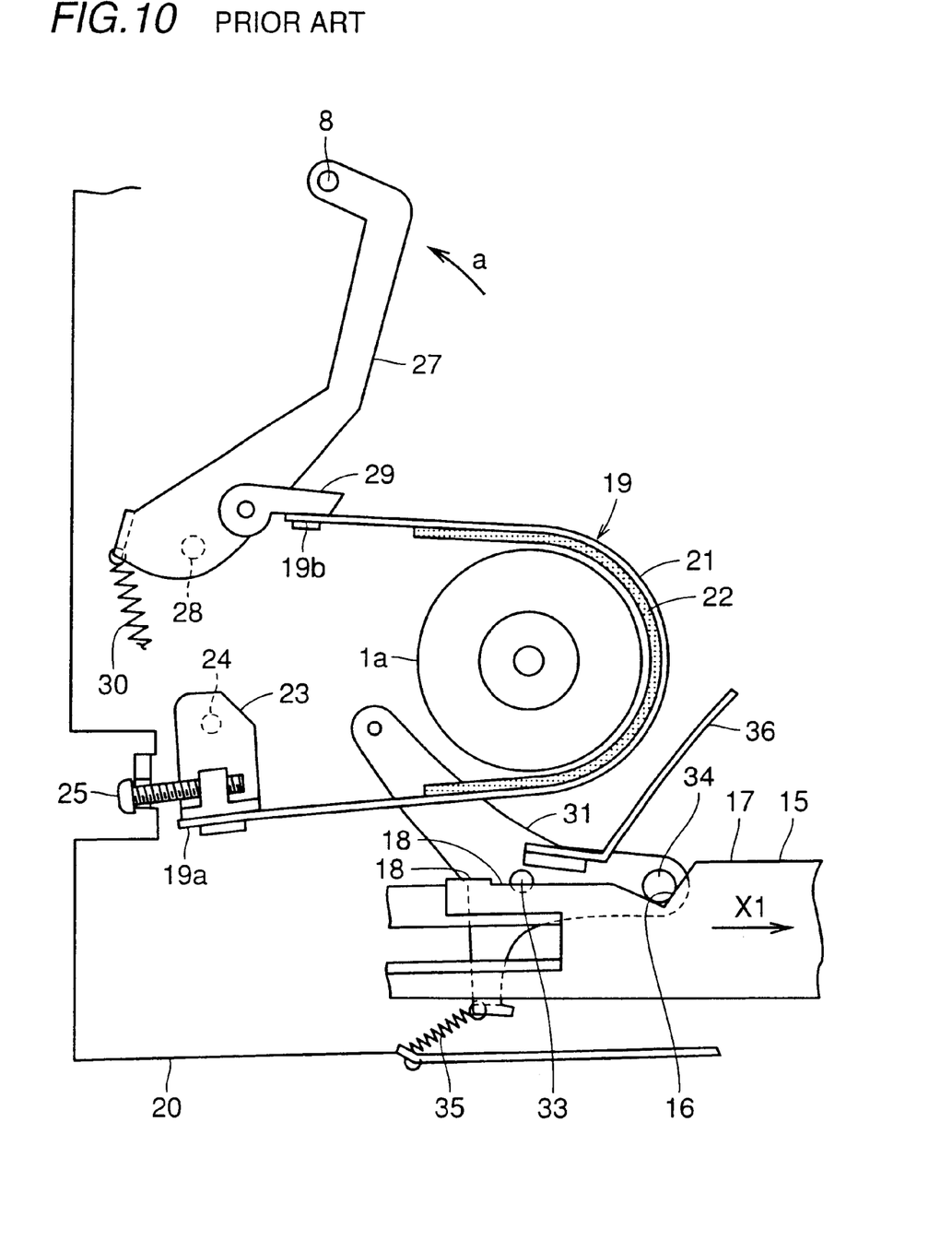
FIG. 10 is a plain view showing the principal parts of the conventional tape deck shown in FIG. 8 in a second stage of the tape loading mode.
Figure 11:
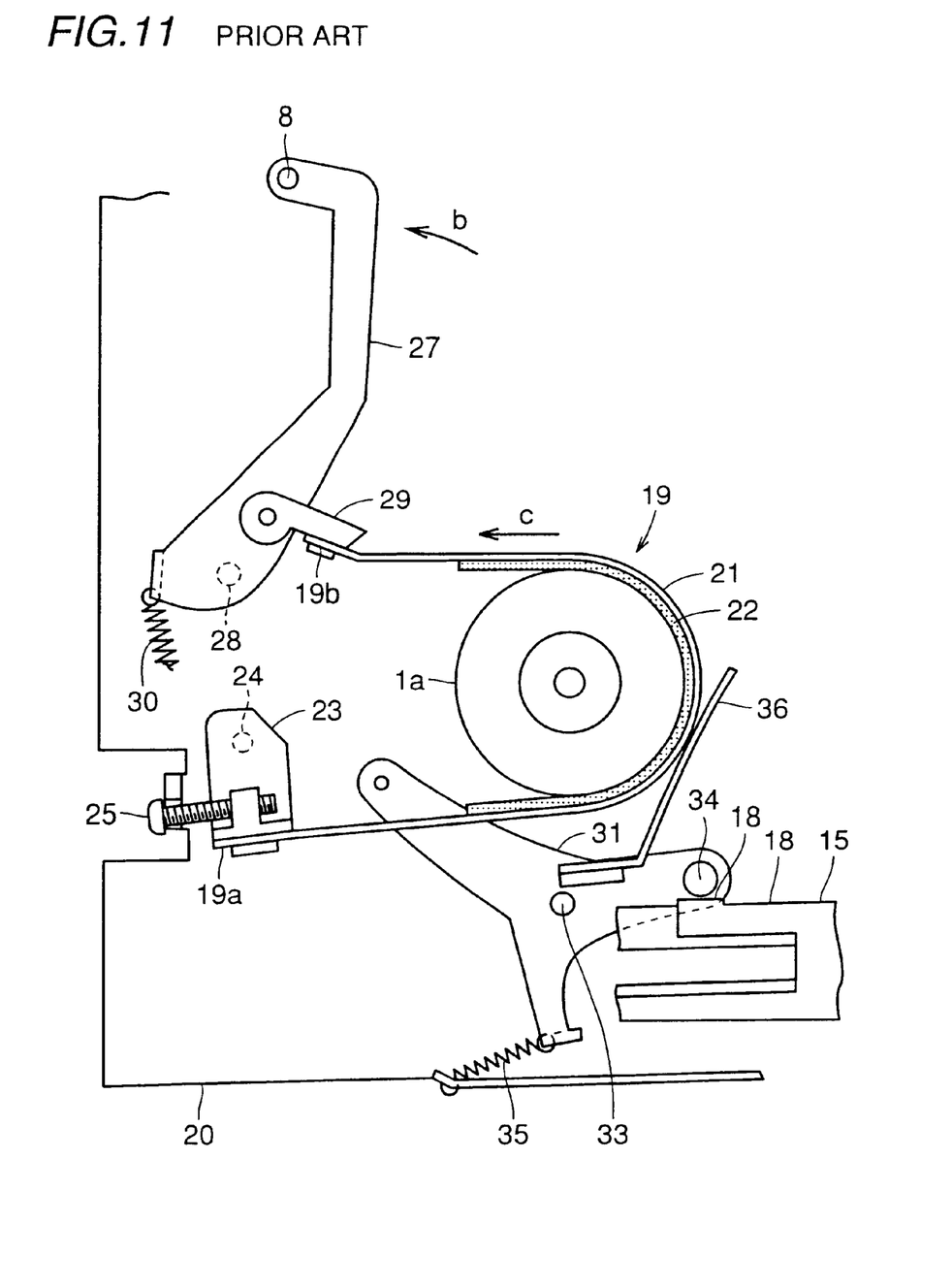
FIG. 11 is a plain view showing the principal parts of the conventional tape deck shown in FIG. 8 in a third stage of the tape loading mode.

The aforementioned gazette also discloses means for preventing the tape T from slacking when loading the tape T on the conventional tape deck shown in FIG. 8. FIG. 9 is a plain view showing principal parts of the conventional tape deck shown in FIG. 8 in a first stage of a tape loading mode, FIG. 10 is a plain view showing the principal parts of the conventional tape deck shown in FIG. 8 in a second stage of the tape loading mode, and FIG. 11 is a plain view showing the principal parts of the conventional tape deck shown in FIG. 8 in a third stage of the tape loading mode.

The means for preventing the tape T from slacking when loading the tape T on the conventional tape deck is now described with reference to FIGS. 8 to 11. Referring to FIG. 9, a brake band 19 is wound on the reel holder 1a. This brake band 19 is formed by a band body 21 of a resin sheet having proper extensibility and a flexible pad 22 held inside the band body 21.

On the left side of the reel holder 1a, a first support shaft 24 provided on a chassis 20 swingably supports a braking torque adjusting member 23. The braking torque adjusting member 23 has a braking torque adjusting screw 25. On the left side of the reel holder 1a, further, a second support shaft 28 provided on the chassis 20 swingably supports a tension lever 27. The braking torque adjusting member 23 holds an end 19a of the brake band 19 on an eccentric portion thereof. A connector 29 mounted on an eccentric portion of the tension lever 27 holds another end 19b of the brake band 19.

A spring 30 urges the tension lever 27 anticlockwise. The aforementioned tension post 8 is provided on the forward end of the tension lever 27.

As shown in FIG. 9, a cam member 15 is formed by a cam plate. The rotating cam 13 shown in FIG. 8 controls X-directional movement of the cam member 15. The cam member 15 includes a bottom portion 16 and first and second crest portions 17 and 18 provided on both sides of the bottom portion 16 respectively. A control lever 31 is provided in correspondence to the cam member 15. A third support shaft 33 provided on the chassis 20 swingably supports the control lever 31. The control lever 31 is provided on one end thereof with a projecting engaging portion 34.

A spring 35 regularly urges the control lever 31 clockwise. Thus, the engaging portion 34 of the control lever 31 regularly engages with the cam surface of the cam member 15 due to the urging force of the spring 35. A presser 36 of a plate spring is mounted on the control lever 31 in a cantilever manner. The presser 36 is opposed to the reel holder 1a through the brake band 19.

When the tape cassette C is set in the aforementioned structure, the tension lever 27 is on the position shown in FIG. 9 for swinging the tension post 8 to a retracted position. The cam member 15 is also on the position shown in FIG. 9, so that the engaging portion 34 is located on the first crest portion 17 of the cam member 15. Thus, the presser 36 provided on the control lever 31 elastically presses an intermediate portion of the brake band 19 against the reel holder 1a. Consequently, the reel holder 1a is held in a braking state (second braking state). The second braking state, rather loose but not slacking the tape T drawn out from the tape cassette C when loading the tape T, is referred to as a soft braking state.

Operations in the first to third stages of the tape loading mode are now described. In the first stage of the tape loading mode, the cam member 15 remains on the regular position. In this first stage, the loading posts 2 move along prescribed paths for drawing out the tape T from the tape cassette C and winding the same on the head cylinder 3. During this tape loading, the tension lever 27 swings along the support shaft 28 from the position shown in FIG. 9, as shown by arrow a shown in FIG. 10. Thus, the tension post 8 moves to an intermediate position between the retracted position and an operating position, as shown in FIG. 10.

Thereafter the tape deck makes transition to the second stage of the tape loading mode. In the second stage, the cam member 15 move from the position along arrow X1 shown in FIG. 10. Thus, the engaging portion 34 of the control lever 31 engages with the bottom portion 16 of the cam surface, so that the control lever 31 consequently rotates clockwise. As a result, the presser 36 is retracted to cancel the aforementioned second braking state (soft braking state).

Then, the tape deck makes transition to the third stage of the tape loading mode. In the third stage, the cam member 15 further moves along arrow X1 shown in FIG. 10, for locating the engaging portion 34 of the control lever 31 on the second crest portion 18 of the cam surface as shown in FIG. 11. The height of the second crest portion 18 is smaller than that of the first crest portion 17. When the engaging portion 34 is located on the second crest portion 18, therefore, the presser 36 does not press the brake band 19 against the reel holder 1a or presses the former against the latter with small force.

On the other hand, the tension lever 27 swings anticlockwise from the intermediate position shown in FIG. 10 along arrow b shown in FIG. 11. Thus, the tension post 8 moves to the operating position for terminating tape loading. In this state, the tape T is wound on the head cylinder 3 as shown in FIG. 8, and supplied with back tension by the tension post 8.

When the tension lever 27 moves the tension post 8 to the operating position, the other end 19b of the brake band 19 held by the tension lever 27 through the connector 29 is pulled along arrow c shown in FIG. 11. Thus, the brake band 19 comes into contact with the reel holder 1a for holding the reel holder 1a in a first braking state. In the first braking state, the tape T can be prevented from slacking in a reproduction mode subsequent to the tape loading mode with braking force stronger than that in the aforementioned second braking state (soft braking state).

The aforementioned conventional tape deck, comprising the brake band 19 and the tension lever 27 for holding the first braking state, separately requires the presser 36 in order to hold the second braking state. In the conventional tape deck, therefore, the number of components as well as the manufacturing cost are disadvantageously increased.

In the conventional tape deck, further, the pressing position and the pressing force must be precisely set when pressing the brake band 19 with the presser 36 of a plate spring, to also result in hindrance of reduction of the manufacturing cost.

SUMMARY OF THE INVENTION

An object of the present invention is to provide a tape deck capable of simplifying a structure for obtaining a braking state.

Another object of the present invention is to reduce the number of components as well as the manufacturing cost with no additional structure for obtaining a second braking state.

A tape deck according to an aspect of the present invention comprises a brake member wound on a reel holder for holding the reel holder in a braking state, a swing member having a tension supply part for supplying a loaded tape with tension and a band pressing part for pressing the brake member thereby bringing the brake member into contact with the reel holder and a movable member coupled with the swing member through an elastic member. Thus, the swing member having the tension supply part is provided with the band pressing part for obtaining a second braking state (soft braking state), so that no additional component may be separately formed for obtaining the second braking state (soft braking state). Consequently, the number of components as well as the manufacturing cost can be reduced.

In the structure of the tape deck according to the aforementioned aspect, the swing member is preferably coupled with an end of the brake member, and the swing member preferably pulls the end of the brake member when the swing member swings to move the tension supply part from a retracted position to an operating position thereby bringing the brake member into contact with the reel holder and obtaining a first braking state. In this case, the first braking state can be readily obtained due to the swinging of the swing member.

In this case, the band pressing part preferably presses the brake member when the swing member swings to move the tension supply part from the operating position to the retracted position thereby bringing the brake member into contact with the reel holder and obtaining a second braking state (soft braking state) having weaker braking force than the first braking state. Thus, the second braking state can be readily obtained due to the swinging of the swing member.

In the aforementioned structure, the operating position of the tension supply part is preferably a position for supplying the loaded tape with tension.

In the structure of the tape deck according to the aforementioned aspect, the band pressing part is preferably set between contact portions of the brake member and the reel holder and the swinging center of the swing member. Thus, the tension supplied from the band pressing part to the brake band can be adjusted by changing the position for setting the band pressing part. In this case, the band pressing part is preferably position-controllably set between the contact portions of the brake member and the reel holder and the swinging center of the swing member. Thus, the position for setting the band pressing part can be readily adjusted for readily adjusting the tension supplied by the band pressing part to the brake band as a result. In order to increase the soft braking force, the band pressing part is approached to the swinging center of the swing member. In order to reduce the soft braking force, the band pressing part is approached to the contact portions of the brake member and the reel holder. Thus, the soft braking force can be readily adjusted.

In the structure of the tape deck according to the aforementioned aspect, the band pressing part may be provided on a position for directly pressing the contact portions of the brake member and the reel holder. Thus, the brake band can be pressed against the reel holder due to elastic return force of the elastic member.

In the structure of the tape deck according to the aforementioned aspect, the movable member is preferably swingable with respect to coupled portions of the swing member and the elastic member in a reciprocating direction. Thus, the movable member is bending-deformed against its elasticity when approached to the coupled portions of the swing member and the elastic member. The band pressing part presses the brake band due to the elastic return force of the bending-deformed elastic member, thereby obtaining the second braking state.

In the structure of the tape deck according to the aforementioned aspect, the elastic member preferably includes a coil spring. When employing a coil spring as the elastic member, the cost for the elastic member can be reduced. In this case, the elastic member may include a helical extension spring. Further, the elastic member may include a coil spring having a compression spring part located at the axial center and tension spring parts located on both sides of the compression spring part to hold the compression spring part therebetween. Further, the elastic member may include a helical extension spring formed by a piano wire. When forming the elastic member by a helical extension spring of a piano wire having strong elastic return force, the force of the band pressing part pressing the brake band can be increased thereby increasing the soft braking force.

According to the present invention, the term "tape deck" indicates a wide concept including a tape deck dedicated to recording having only a function of recording information in a tape, a tape deck dedicated to reproduction having only a function of reproducing information from a tape recording the information and a tape deck for recording/reproduction having both functions of recording information in a tape and reproducing the information from the tape.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention are now described with reference to the drawings.

(First Embodiment)

Figure 1:
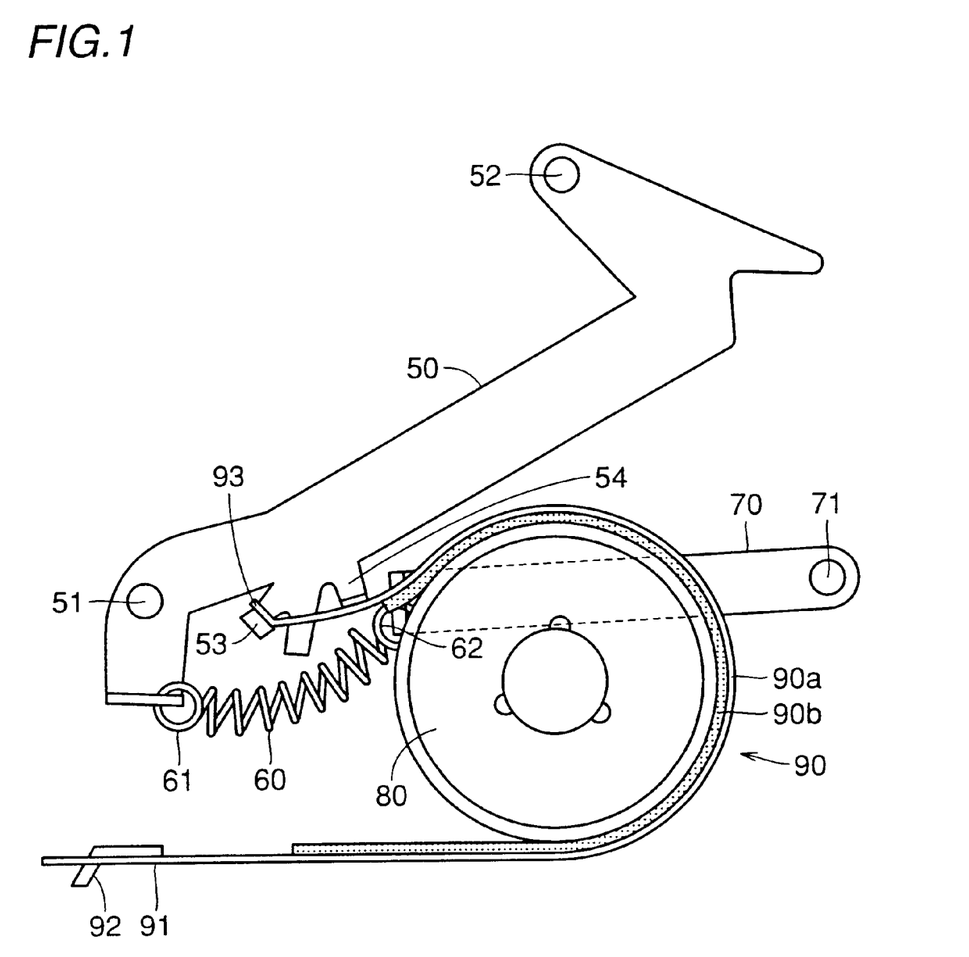
FIG. 1 is a plain view showing principal parts of a tape deck according to a first embodiment of the present invention in a first stage of a tape loading mode.

A tape deck according to a first embodiment of the present invention is described with reference to FIGS. 1 to 3. As shown in FIG. 1, the tape deck according to the first embodiment comprises a swing lever 50, an elastic member 60 formed by a helical extension spring of stainless steel, a movable member 70 and a brake band 90.

The swing lever 50 corresponds to the tension lever 27 of the conventional tape deck shown in FIGS. 9 to 11. A support shaft 51 provided on a chassis (not shown) swingably supports the swing lever 50. A tension post 52 for supplying a loaded tape with tension is provided on one end of the swing lever 50. An end 61 of the elastic member 60 is coupled to the other end of the swing lever 50.

A support shaft 71 provided on the chassis (not shown) swingably supports the movable member 70. The movable member 70 is swingable with respect to coupled portions of the swing lever 50 and the elastic member 60 in a reciprocating direction. Another end 62 of the elastic member 60 is coupled to a free end of the movable member 70. In other words, the movable member 70 is coupled with the swing lever 50 through the elastic member 60. The conventional cam member 15 shown in FIGS. 9 to 11, for example, can control the movable member 70 to swing.

The brake band 90 is wound on a reel holder 80. The brake band 90 is formed by a band body 90a of a resin sheet having proper extensibility and a pad 90b held inside the band body 90a. A stop member 92 provided on the chassis (not shown) holds an end 91 of the brake band 90. Another end 93 of the brake band 90 is coupled to a latch member 53 provided on a position separate from the support shaft 51 of the swing lever 50 with a prescribed space.

According to the first embodiment, the swing lever 50 of an iron plate is integrally provided with a band presser 54. The band presser 54 is formed by an iron plate and has no spring property. The band presser 54 presses the brake band 90 for pulling the same thereby bringing the brake band 90 into contact with the reel holder 80. The band presser 54 is set on a prescribed position between contact portions of the brake band 90 and the reel holder 80 and the support shaft 51 (swinging center) of the swing lever 50.

Thus, the tension (soft braking force) supplied to the brake band 90 by the band pressing part 54 can be adjusted by changing the position for setting the band pressing part 54 due to the aforementioned structure. In order to increase the soft braking force, the band pressing part 54 is set closer to the support shaft 51 (swinging center) of the swing lever 50. In order to reduce the soft braking force, the band pressing part 54 is set closer to the contact portions of the brake band 90 and the reel holder 80. Thus, the soft braking force can be readily adjusted.

Operations in first to third stages of a tape loading mode in the tape deck according to the first embodiment are now described. In the first stage of the tape loading mode, the movable member 70 is close to coupled portions of the swing lever 50 and the end 61 of the elastic member 60, as shown in FIG. 1. Thus, the swing lever 50 swings clockwise for moving the tension post 52 from an operating position to a retracted position. In this state, the elastic member 60 pressed by the movable member 70 arcuately bending-deformed against its elasticity. The band pressing part 54 presses the brake band 90 due to elastic return force of the bending-deformed elastic member 60. Thus, the brake band 90 is pulled to consequently come into contact with the reel holder 80.

In the state shown in FIG. 1, the contact pressure of the brake band 90 on the reel holder 80 is attained only through the elastic return force of the bending-deformed elastic member 60. Therefore, the tape deck is in a second braking state (soft braking state) having weaker braking force than a first braking state described later. The second braking state is set for preventing a tape from slacking when loading the tape. In the second braking state, an operation of drawing out the tape from a tape cassette located on a set position and loading the same is smoothly performed without slacking the tape.

Thereafter the tape deck makes transition to the second stage of the tape loading mode. In the second stage, the movable member 70 swings along arrow a shown in FIG. 2, thereby pulling the swing lever 50 coupled to the movable member 70 through the elastic member 60. Thus, the swing lever 50 swings anticlockwise along arrow b. Therefore, the band pressing part 54 moves to separate from the brake band 90 for canceling the second braking state (soft braking state). Consequently, the reel holder 80 is released from the braking by the brake band 90.

Then, the tape deck makes transition to the third stage of the tape loading mode. The movable member 70 further swings along arrow a as shown in FIG. 3, so that the swing lever 50 hits a stopper 40 and stops. Thus, the tension post 52 reaches the operating position for supplying tension to the loaded tape. The elastic member 60 is so extended as to keep the swing lever 50 in contact with the stopper 40. In this state, the brake band 90 pulled by the swing lever 50 comes into contact with the reel holder 80 for obtaining the first braking state.

The first braking state, set for preventing the tape from slacking in a recording/reproduction mode subsequent to the tape loading mode, has stronger braking force than the aforementioned second braking state (soft braking state).

According to the first embodiment, the swing lever 50 having the tension post 52 is integrally provided with the band pressing part 54 for obtaining the second braking state (soft braking state) as described above, whereby no additional component may be separately formed for obtaining the second braking state (soft braking state). Consequently, the number of components as well as the manufacturing cost can be reduced.

Further, both of the first and second braking states can be obtained by simply adjusting the swinging position of the swing lever 50.

(Second Embodiment)

Figure 4:
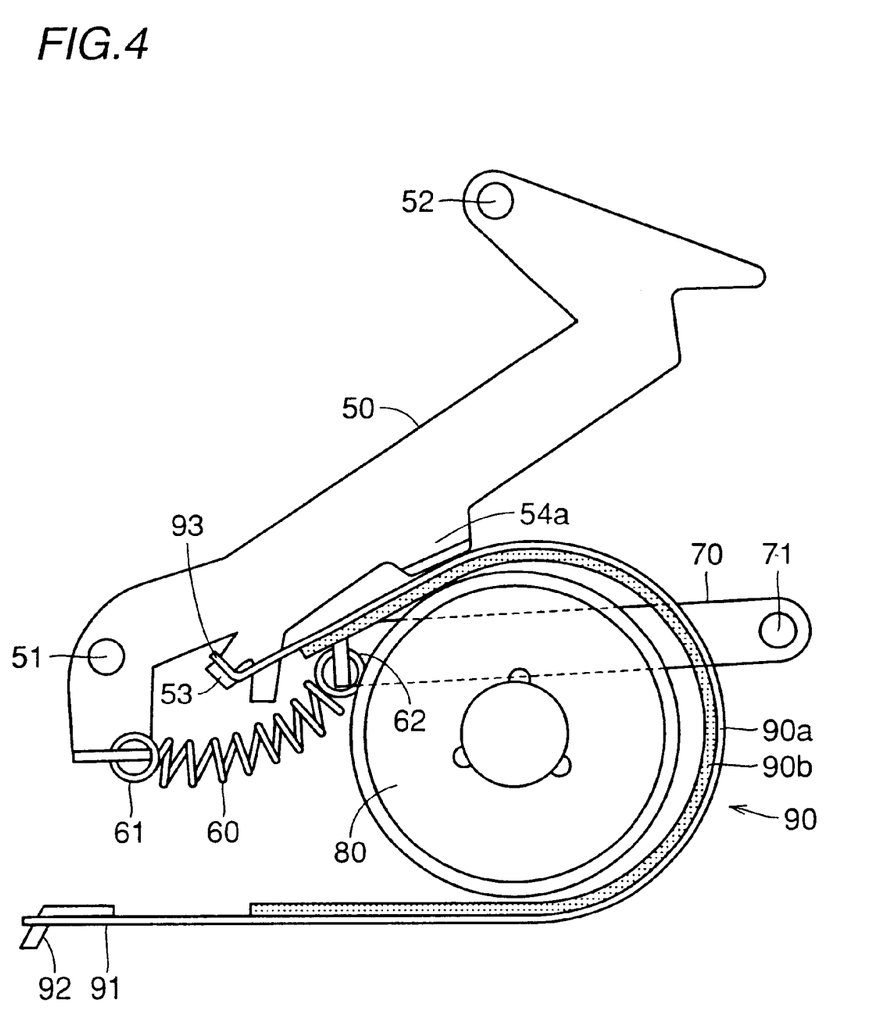
FIG. 4 is a plain view showing principal parts of a tape deck according to a second embodiment of the present invention in a first stage of a tape loading mode.
Figure 5:
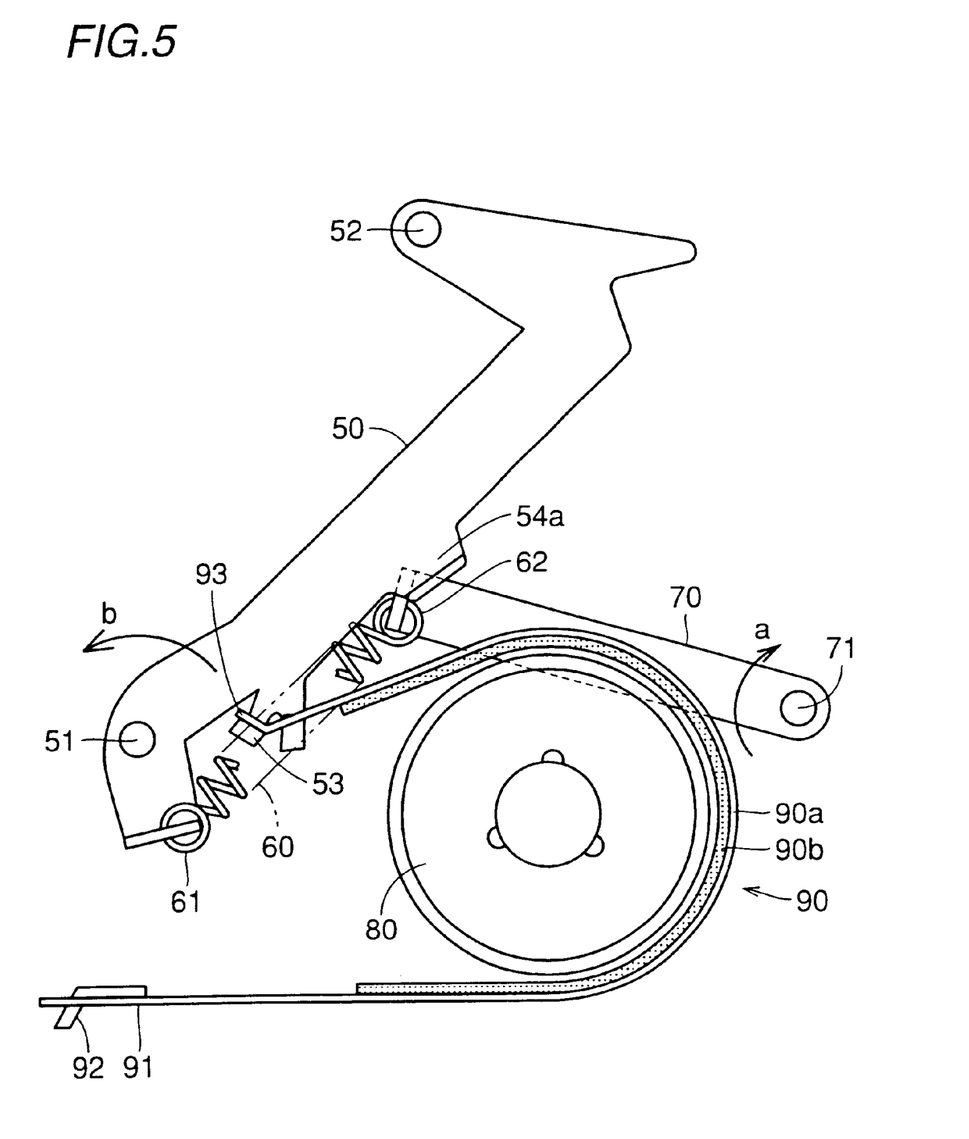
FIG. 5 is a plain view showing the principal parts of the tape deck according to the second embodiment of the present invention in a second stage of the tape loading mode.
Figure 6:
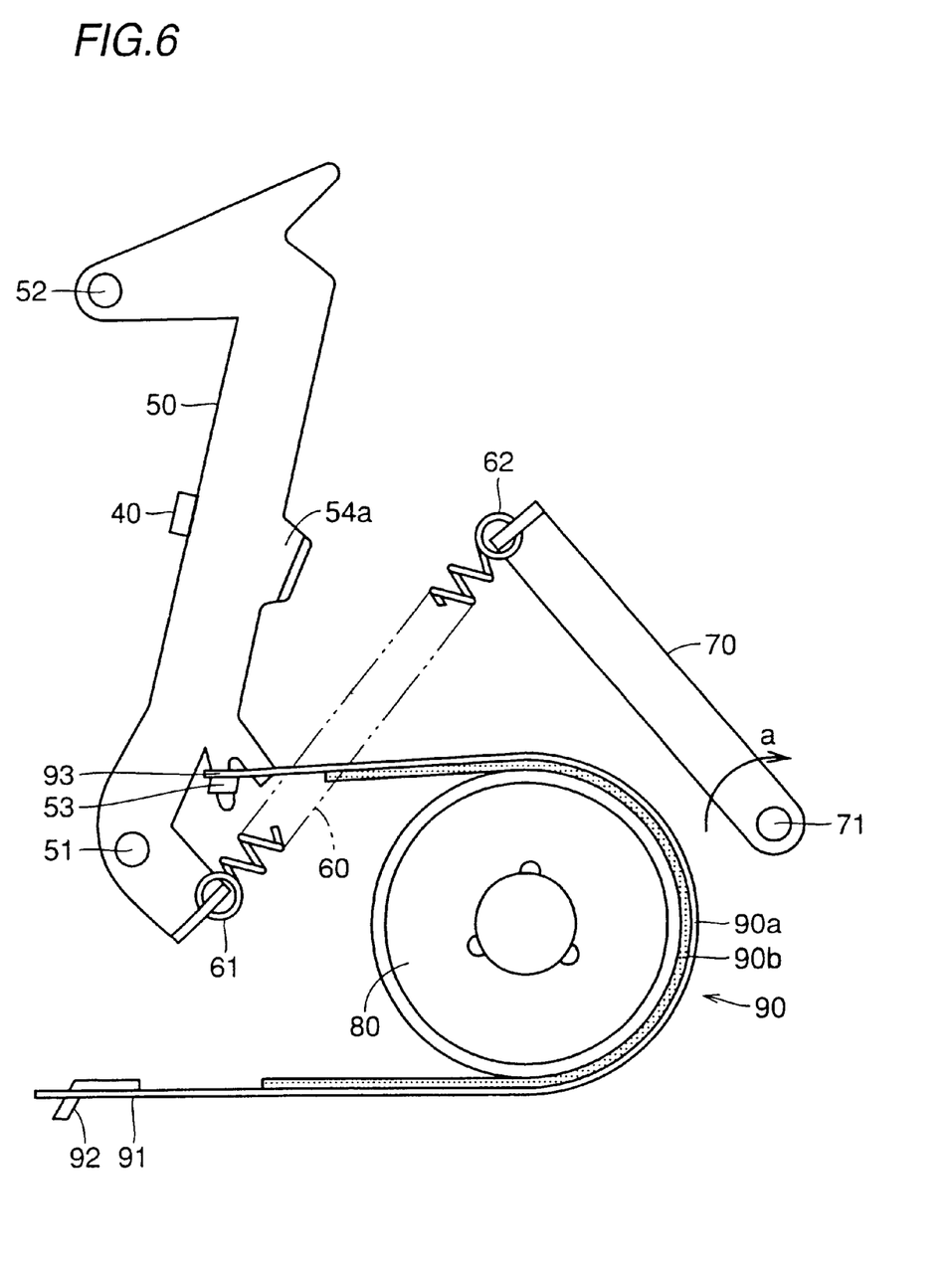
FIG. 6 is a plain view showing the principal parts of the tape deck according to the second embodiment of the present invention in a third stage of the tape loading mode.

Referring to FIGS. 4 to 6, a band pressing part 54i ais fixedly set on a position for directly pressing contact portions of a brake band 90 and a reel holder 80 in a tape deck according to a second embodiment of the present invention, dissimilarly to the aforementioned first embodiment. The remaining structure of the tape deck according to the second embodiment is identical to that of the first embodiment.

According to the second embodiment, the band pressing part 54a can press the brake band 90 against the reel holder 80 due to elastic return force of an elastic member 60. Thus, a second braking state (soft braking state) can be obtained.

In order to increase the force (soft braking force) of the band pressing part 54a pressing the brake band 90 against the reel holder 80 in the second embodiment, a helical extension spring of stainless steel forming the elastic member 60 is changed to a helical extension spring of a material (e.g., a piano wire) having stronger elastic return force. Thus, the elastic return force of the elastic member 60 is increased thereby increasing the force of the band pressing part 54a pressing the brake band 90 against the reel holder 80. Consequently, the soft braking force can be increased.

Figure 2:
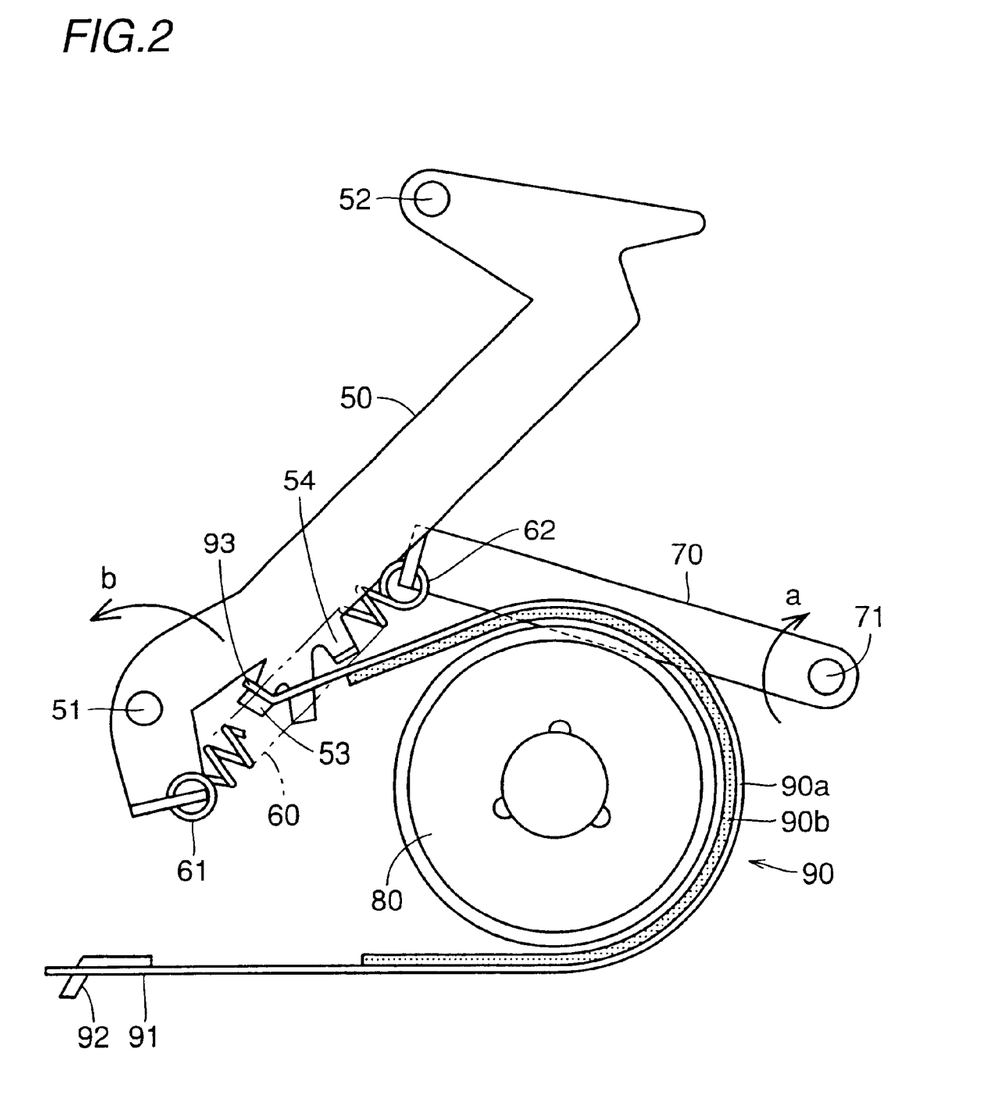
FIG. 2 is a plain view showing the principal parts of the tape deck according to the first embodiment of the present invention in a second stage of the tape loading mode.
Figure 3:
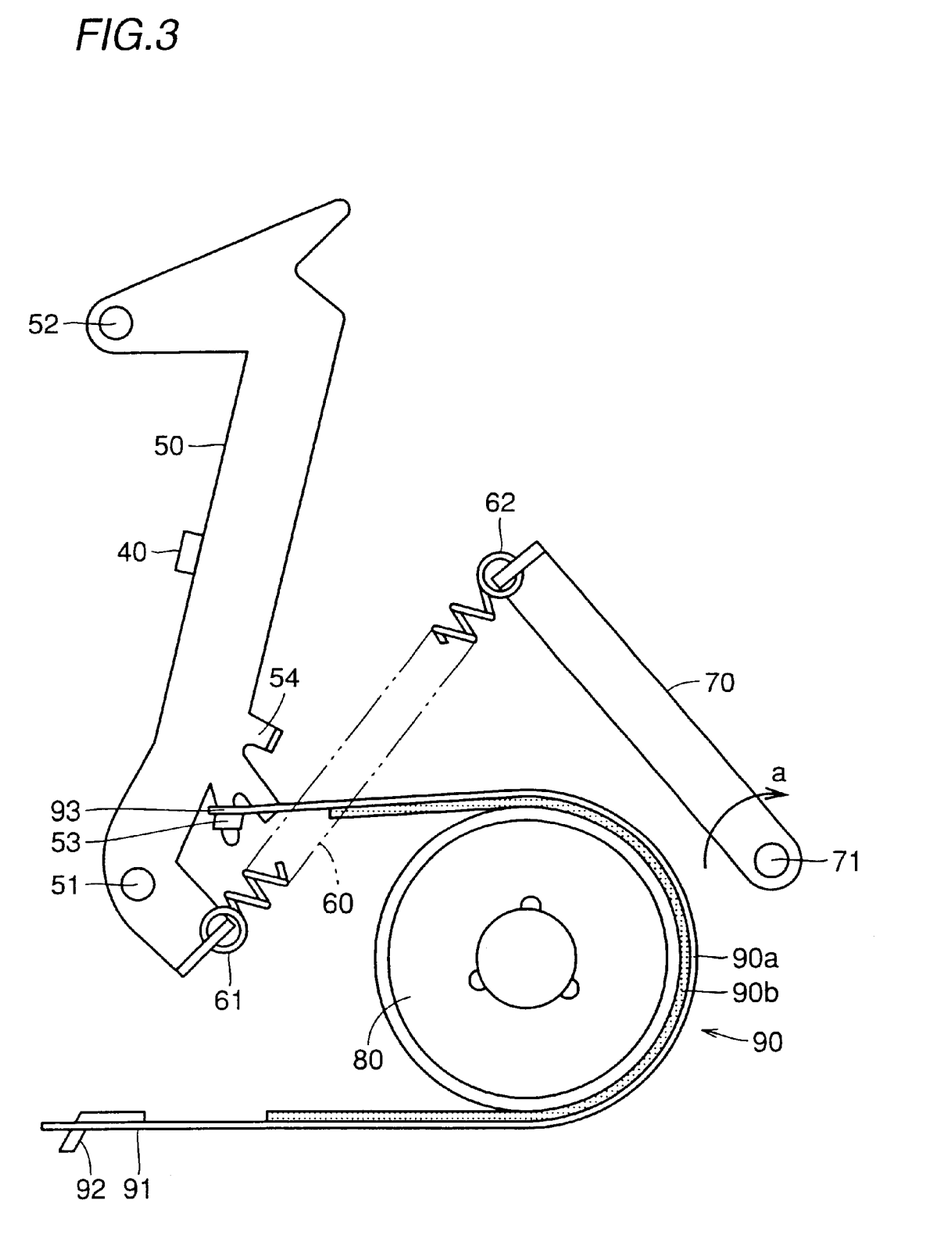
FIG. 3 is a plain view showing the principal parts of the tape deck according to the first embodiment of the present invention in a third stage of the tape loading mode.

Operations in first to third stages of a tape loading mode in the tape deck according to the second embodiment shown in FIGS. 4 to 6 are substantially similar to those in the first to third stages of the tape loading mode according to the first embodiment shown in FIGS. 1 to 3 respectively. However, the second embodiment is different from the first embodiment in a point that the band pressing part 54a directly presses the brake band 90 against the reel holder 80 thereby obtaining the second braking state (soft braking state) in the first stage shown in FIG. 4.

According to the second embodiment, a swing lever 50 having a tension post 52 is integrally provided with the band pressing part 54a for obtaining the second braking state (soft braking state) similarly to the aforementioned first embodiment, whereby no additional component may be separately formed for obtaining the second braking state (soft braking state). Consequently, the number of components as well as the manufacturing cost can be reduced.

Although the present invention has been described and illustrated in detail, it is clearly understood that the same is by way of illustration and example only and is not to be taken by way of limitation, the spirit and scope of the present invention being limited only by the terms of the appended claims.

Figure 7:
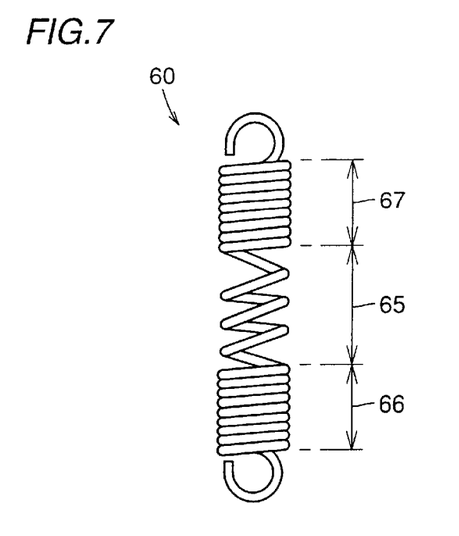
FIG. 7 is a side elevational view showing a modification of an elastic member according to the first or second embodiment of the present invention.

While the elastic member 60 is formed by a helical extension spring in each of the aforementioned first and second embodiments, for example, the present invention is not restricted to this but another coil spring can be employed. For example, such a coil spring may have a compression spring part 65 located at the axial center and tension spring parts 66 and 67 positioned on both sides of the compression spring part 65 to hold the compression spring part 65 therebetween.

While the band pressing part 54 is fixedly set in the aforementioned first embodiment, the present invention is not restricted but the band pressing part 54 may alternatively be position-controllably set between the contact portions of the brake band 90 and the reel holder 80 and the support shaft 51 (swinging center) of the swing lever 50. In this case, the tension (soft braking force) supplied to the brake band 90 by the band pressing part 54 can be readily adjusted by properly changing the position of the band pressing part 54. In order to increase the soft braking force, the band pressing part 54 is position-controlled to be closer to the support shaft 51 (swinging center) of the swing lever 50. In order to reduce the soft braking force, the band pressing part 54 is position-controlled to be closer to the contact portions of the brake band 90 and the reel holder 80. Thus, the soft braking force can be readily adjusted.

What is claimed is:

1. A tape deck comprising:

a brake member wound on a reel holder for holding said reel holder in a braking state;

a swing member having a tension supplying part for supplying a loaded tape with tension during a recording/reproduction mode, and a band pressing part for pressing said brake member and thereby bringing said brake member into contact with said reel holder during a tape loading mode; and a movable member coupled with said swing member through an elastic member.

2. The tape deck according to claim 1, wherein said swing member is coupled with an end of said brake member, and said swing member pulls said end of said brake member when said swing member swings to move said tension supply part from a retracted position to an operating position thereby bringing said brake member into contact with said reel holder and obtaining a first braking state.

3. The tape deck according to claim 2, wherein said band pressing part presses said brake member when said swing member swings to move said tension supply part from said operating position to said retracted position thereby bringing said brake member into contact with said reel holder and obtaining a second braking state having weaker braking force than said first braking state.

4. The tape deck according to claim 2, wherein said operating position of said tension supply part is a position for supplying said loaded tape with tension.

5. The tape deck according to claim 1, wherein said swing member has a swinging center, and wherein said band pressing part is set on a prescribed position between contact portions of said brake member and said reel holder and the swinging center of said swinging member.

6. The tape deck according to claim 5, wherein said band pressing part is position-controllably set between said contact portions of said brake member and said reel holder and the swinging center of said swing member.

7. The tape deck according to claim 1, wherein said band pressing part is provided on a position for directly pressing contact portions of said brake member and said reel holder.

8. The tape deck according to claim 1, wherein
said movable member is swingable with respect to coupled portions of said swing member and said elastic member in a reciprocating direction.

9. The tape deck according to claim 1, wherein
said elastic member includes a coil spring.

10. The tape deck according to claim 9, wherein
said elastic member includes a helical extension spring.

11. The tape deck according to claim 9, wherein
said elastic member includes a coil spring having a compression spring part located at the axial center and tension spring parts located on both sides of said compression spring part to hold said compression spring part therebetween.

12. The tape deck according to claim 9, wherein
said elastic member includes a helical extension spring formed by a piano wire.

\* \* \* \* \*